United States Patent
Chung et al.

[11] Patent Number: 5,822,141
[45] Date of Patent: Oct. 13, 1998

[54] HIGH SPEED FET WRITE DRIVER FOR AN INDUCTIVE HEAD

[75] Inventors: Paul Wingshing Chung; John Thomas Contreras; Calvin Shizuo Nomura, all of San Jose, Calif.

[73] Assignee: International Business Machines Corporation, Armonk, N.Y.

[21] Appl. No.: 622,804

[22] Filed: Mar. 27, 1996

[51] Int. Cl.[6] ....................................................... G11B 5/03
[52] U.S. Cl. ................................. 360/46; 360/67; 360/68
[58] Field of Search ................................ 360/46, 67, 68; 330/289, 299, 300; 327/110, 109, 55, 57, 108, 111

[56] References Cited

U.S. PATENT DOCUMENTS

| | | | |
|---|---|---|---|
| 4,933,785 | 6/1990 | Morehouse et al. | 360/77.02 |
| 4,937,467 | 6/1990 | Tuska et al. | 307/246 |
| 5,028,811 | 7/1991 | LeRoux et al. | 307/270 |
| 5,057,720 | 10/1991 | Hattori | 307/571 |
| 5,287,231 | 2/1994 | Shier et al. | 360/46 |
| 5,296,975 | 3/1994 | Contreras et al. | 360/46 |
| 5,339,202 | 8/1994 | Heinz et al. | 360/46 |
| 5,371,415 | 12/1994 | Dixon et al. | 327/109 |
| 5,386,328 | 1/1995 | Chiou et al. | 360/68 |
| 5,430,584 | 7/1995 | Peterson | 360/78.04 |
| 5,444,579 | 8/1995 | Klein et al. | 360/67 |
| 5,455,816 | 10/1995 | Bitting | 369/124 |
| 5,546,030 | 8/1996 | Cameron | 360/46 X |
| 5,612,828 | 3/1997 | Brannon et al. | 360/46 |

*Primary Examiner*—Aristotelis M. Psitos
*Assistant Examiner*—K. Wong
*Attorney, Agent, or Firm*—Baker Maxham Jester & Meador

[57] ABSTRACT

An FET write driver providing high rates of data transfer to a magnetic storage medium by effectively utilizing the voltage swing provided by supply voltage. A first and a second p-channel FET power switch are coupled between the voltage supply and the inductive head, each having a high aspect ratio for low resistance. A first and a second current mirror are coupled at their inputs to the inductive head and a current source, each current mirror having a reference arm coupled to the current source and a mirror arm coupled to the inductive head. Each current mirror has an output coupled respectively to a first and a second mirror enabling FET switch, each having a high aspect ratio for low resistance. A pair of differential signals dp and dn selects the ON and OFF states of the FET switches to provide either a first current path through the first FET power switch and the second current mirror to provide a write current in a first direction or a second current path through the second FET power switch and the first current mirror to provide a write current in a second opposite direction. During operation, the low voltage drops across the FET switches allow for a substantial portion of the voltage supply to be available for writing using the inductive head. The circuit is inherently stable and avoids ringing and overshoot, which results in improved timing and maintains signal integrity. The write driver can operate with low voltage power supplies for cost reduction or low power consumption in products such as portable computers while still retaining a high data transfer rate. For multiple head disk drive units, a plurality of write drivers are provided that include an additional switch at the current source input, which allows a single current source to be utilized as a reference current and a single set of differential signals to control all of the write circuits.

38 Claims, 7 Drawing Sheets

HIGH SPEED FET WRITE DRIVER FOR AN INDUCTIVE HEAD

BACKGROUND OF THE INVENTION

1. Field of the Invention

The invention relates to write drivers for an inductive head in a magnetic data storage system, and particularly to write drivers that have low power consumption and write at a high data transfer rate.

2. Description of the Related Art

Conventional storage systems include an inductive head that uses an inductive element to write information on a recording surface of a magnetic media, such as a magnetic disk. The inductive element usually is an inductive coil that writes information by creating a changing magnetic field. A write driver circuit is connected to the inductive head at first and second head terminals. During writing operations, the write driver circuit forces a relatively large write current through the inductive coil to create a magnetic field that polarizes adjacent bit positions on the recording surface. Digital information is stored by reversing the polarization of selected bit positions which is done by reversing the direction of the current flow in the inductive coil.

A typical write driver circuit includes an "H-switch" for controlling the direction of current flow through the inductive coil. The H-switch includes upper ("pull-up") bipolar transistors and lower ("pull-down") bipolar transistors. The upper bipolar transistors are connected between a first supply voltage and the head contacts. The lower bipolar transistors are connected between the head terminals and a second supply voltage through a write current sink. The write driver circuit controls the direction of current flow through the inductive coil by driving selected transistors in the H-switch between ON and OFF states, thereby applying a limited voltage swing across the head contacts for reversing current flow and polarizing the adjacent bit position.

The rate at which information can be stored on a recording surface through the inductive head is directly proportional to the rate at which the direction of current can be reversed in the inductive coil. The rise/fall time of the inductive coil is determined by:

$$di/dt = V/L \qquad \text{Eq. 1}$$

where $di/dt$ is the rate of change of the current over time across the inductive coil, $V$ is the available voltage across the inductive coil, and $L$ is the inductive load. Therefore, the speed of the H-switch is directly proportional to the available voltage across the inductive coil. The available voltage is determined by subtracting the voltage drops across the pull-up transistors, the pull-down transistors and the write current sink from the supply voltage.

Conventional write drivers such as those described in U.S. Pat. Nos. 5,296,975 and 5,287,231 use bipolar transistors in the switches that drive current through an inductive magnetic head. Usually, the write circuit is implemented on a semiconductor chip with other circuits that include field effect transistors (FETs) formed in a metal-oxide semiconductor ("MOS") process, together with the bipolar transistors. One problem with such a circuit is its cost; for example, to implement a circuit that combines MOS and bipolar technologies in a chip, a more expensive Bi-CMOS process is needed.

Another problem with drivers that use conventional bipolar transistors is that the voltage provided by the fixed voltage source is ineffectively utilized and therefore performance is adversely affected, resulting in a lower data transfer rate. For example, in a typical configuration in which an inductive head is coupled between a first and a second bipolar transistor that are coupled between a five volt source and ground, each bipolar transistor reduces the voltage by 0.7 volts due to the inherent diode drop at the base-emitter junction. As a result, only about 70% (3.6 volts) of the original five volts is available to drive the write head. This voltage reduction slows the speed at which the inductive head can be driven because the rate of current increase in the inductive head is directly proportional to the applied voltage, a result that follows from Eq. 1. Thus, if a greater voltage were to be made available to write to the inductive head, for example if most of the five volts provided by the power supply were available, a faster write operation could be performed and the data transfer rate could be increased accordingly. One way of increasing the available voltage is to operate the bipolar transistors in their saturation mode, in which instance the voltage drop is 0.3 to 0.4 at each transistor. However, operating in a saturation mode substantially reduces the bipolar transistor's switching speed, slowing data transfer rates.

In order to acceptably increase data transfer rates using conventional bipolar transistors, the supply voltage must be increased. For example, if the supply voltage is increased to 6.4 volts then the available writing voltage increases to 5.0 volts. However, increasing the supply voltage increases power consumption and requires a more expensive power supply, rendering this approach unsuitable for limited or low power uses. Furthermore, increased power consumption can lead to thermal problems and reduce the life of the circuit.

An additional problem with the conventional H-switch is the relatively large voltage swings generated by the bipolar transistors at the head terminals during the write mode operation. Because current through the load (which is an inductor) cannot change instantaneously, the voltage swings have a tendency to rise above their forcing voltage causing a voltage spike. In the conventional H-switch this is particularly a problem because of the relatively low breakdown voltages of the switching transistors.

Another problem with conventional bipolar transistor write drivers is their lack of stability, which unfortunately causes the driver's output to "ring" after a transition before finally stabilizing. Ringing can cause timing problems that can adversely affect the maximum data transfer rate.

SUMMARY OF THE INVENTION

The present invention provides an FET write driver that achieves high rates of data transfer to a magnetic storage medium by effectively utilizing the voltage swing provided by a supply voltage. The circuit is inherently stable and it avoids ringing and overshoot experienced by conventional bipolar write drivers, which improves timing jitter and maintains signal integrity. In a semiconductor chip implementation, the FETs of the write driver can be implemented in an all CMOS design which advantageously allows the entire chip to be an all CMOS chip design rather than a more expensive hybrid BiCMOS design. As an additional advantage, the voltage supply that powers the driver can be scaled down to a low value such as 3.3 volts, for purposes such as cost reduction and/or low power consumption in products such as portable computers, while still retaining a high data transfer rate.

The high speed FET write driver disclosed herein utilizes a voltage source connected to a first and a second FET power switch that are coupled on their other ends to the inductive head. Each FET power switch has an ON state and an OFF state. A current source supplies a predetermined reference current $I_R$ to a first and second current mirror. Each current mirror has a reference arm coupled to the current source, and a mirror arm coupled to the inductive head. A first and second mirror enabling FET switch, each having an ON and and OFF state, is coupled to the first and second current mirrors. Particularly, the reference arm and the mirror arm in the first current mirror are coupled to the first mirror enabling FET switch, and the reference arm and the mirror arm of the second current mirror are coupled to the second mirror enabling FET switch. A differential signal is provided to select said ON and OFF state of said first and second power FET switch and said first and second mirror enabling FET switch, to provide either a first current path through the first power switch, the inductive head in the first direction, the second current mirror and the second current mirror enabling switch, or a second current path through the second power switch, the inductive head in a second direction, the first current mirror, and the first mirror enabling switch.

In order to disable the write circuit when not writing, a first and a second grounding switch are coupled between the inductive head and ground. In the ON state, in which the write driver circuit is unselected by coupling the inductive head to ground, the first and second grounding switch provide this path. Furthermore, in some embodiments, the grounding circuit includes a third FET coupled between the first and second current mirrors and ground, for grounding the current mirrors to prevent current leakage.

In an embodiment for a multi-head disk drive assembly in which multiple write drivers are implemented on a single chip, each write driver can include an additional switch at the current source input. In operation, only one of these switches is turned on at any one time, so that write current is supplied only to the single write driver that is actually writing, while the other switches prevent the current source from being applied to all other write drivers. As a result, only a single current source is needed to supply the current for all the drivers. Furthermore, because only one write circuit is supplied with current at any given time, only a single complementary pair of inputs is needed. These two inputs, termed the "dp" and "dn" signals, are connected in parallel between the multiple write drivers.

In an alternative embodiment for a multi-head disk assembly in which multiple write drivers are implemented on a single chip, a separate current source is provided for each of the write drivers in order to supply the current necessary to operate multiple write drivers in parallel. Each write driver has a separate control line (SWHON$_n$) that enables operation. Only a single complementary pair of inputs, connected in parallel to all the write drivers, is needed. This alternative embodiment is useful in manufacturing, for example, to write multiple duplicate signal patterns such as a prewritten sector servo pattern to disk.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Disk Drive System

Figure 1:
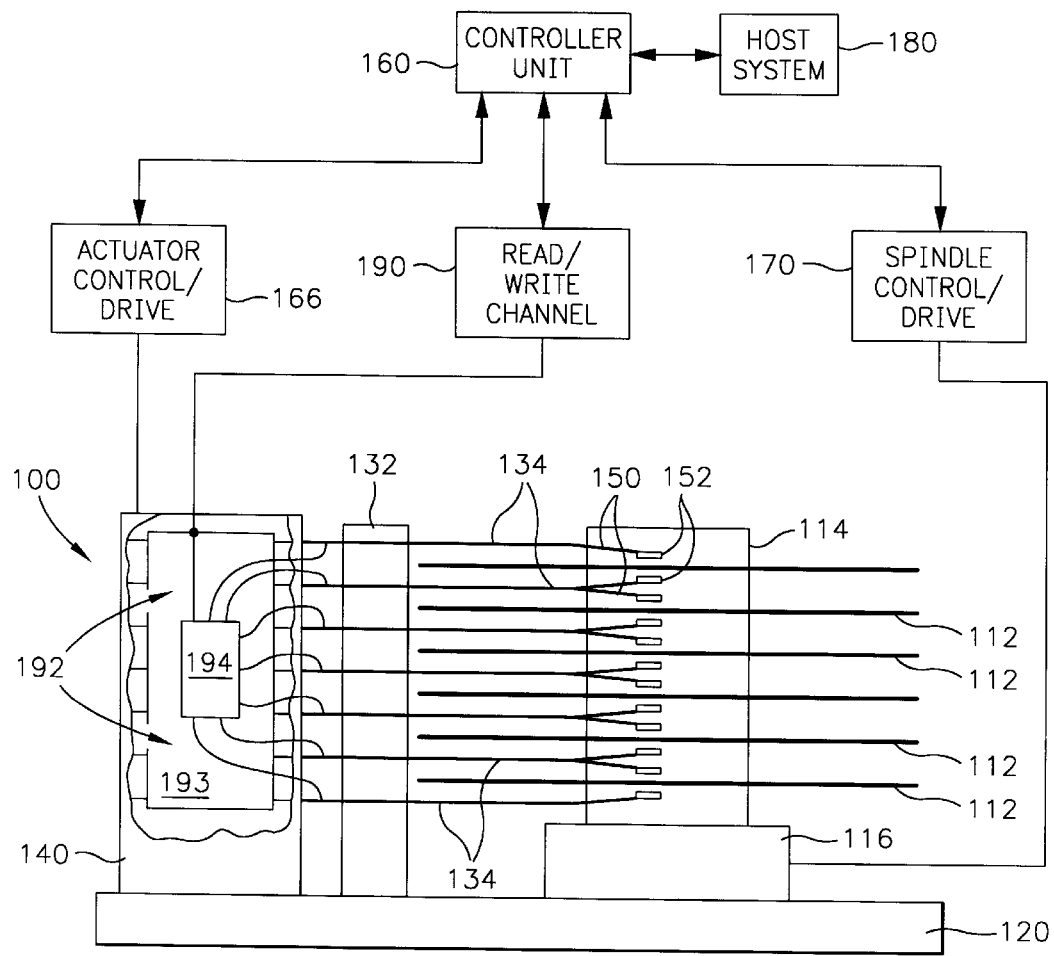
FIG. 1 is a side view of a disk drive system including a plurality of stacked magnetic recording disks, an actuator arm, and control circuitry in a block diagram.
Figure 2:
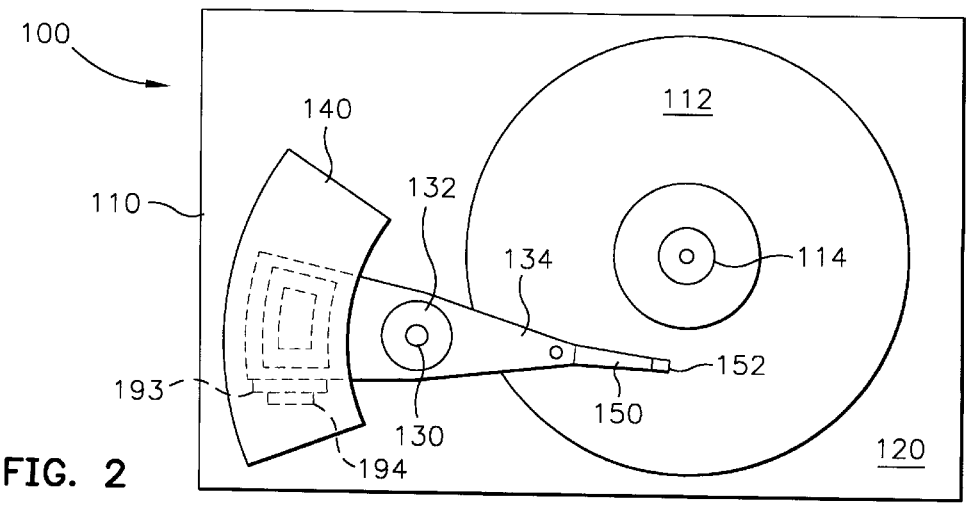
FIG. 2 is a top view of a disk drive system showing the magnetic recording disk, actuator arm, and rotary voice coil for moving the actuator arm.

FIGS. 1 and 2 show a side and a top view, respectively, of a disk drive system designated by the general reference number 100, within an enclosure 110. The disk drive system 100 comprises a plurality of stacked magnetic recording disks 112 mounted to a spindle 114. The disks 112 may be conventional particulate or thin film recording disks or, in other embodiments, they may be recently proposed liquid bearing disks. The spindle 114 is attached to a spindle motor 116 which rotates the spindle 114 and disks 112. A chassis 120, connected to the enclosure 110, provides stable mechanical support for the disk drive system. The spindle motor 116 and an actuator shaft 130 are attached to the chassis 120. A hub assembly 132 rotates about the actuator shaft 130 and supports a plurality of actuator arms 134. The stack of actuator arms 134 is sometimes referred to as a "comb". A rotary voice coil motor 140 is attached to chassis 120 and to a rear portion of the actuator arms 134.

A plurality of head suspension assemblies 150 are attached to the actuator arms 134. A plurality of inductive transducer heads 152 are attached respectively to the suspension assemblies 150, each head 152 including at least one inductive write element. In addition thereto, each head 152 may also include an inductive read element or a MR (magneto-resistive) read element. The heads 152 are positioned proximate to the disks 112 by the suspension assemblies 150 so that, during operation, the heads therein are in electromagnetic communication with the disks 112. The rotary voice coil motor 140 rotates actuator arms 134 about the actuator shaft 130 in order to move the head suspension assemblies 150 to the desired radial position on disks 112.

A controller unit 160 provides overall control to the disk drive system 100, including rotation control of the disks 112 and position control of the heads 152. The controller unit 160 typically includes (not shown) a central processing unit (CPU), a memory unit and other digital circuitry, although it should be apparent that these aspects could also be enabled as hardware logic by one skilled in the computer arts. Controller unit 160 is connected to an actuator control/drive unit 166 which in turn is connected to the rotary voice coil motor 140. A host system 180, typically a computer system, is connected to the controller unit 160. The host system 180 may send digital data to the controller unit to be stored on the disks, or it may request that digital data at a specified location be read from the disks and sent back to the host system. The basic operation of DASD (Direct Access Storage Device) units is well known in the art and is described in more detail in *The Magnetic Recording Handbook*, C. Dennis Mee and Eric D. Daniel, McGraw-Hill Book Company, 1990.

A read/write channel 190 is coupled to receive read and write signals generated by the controller unit 160, and communicate them to an arm electronics (AE) unit shown generally at 192 through a cut-away portion of the voice coil 140. The AE unit 192 includes a printed circuit board 193, or a flexible carrier, mounted on the actuator arms 134, or in close proximity thereto, and an AE module 194 mounted on the circuit board or carrier that comprises circuitry preferably implemented in an integrated circuit (IC) chip, including read drivers, write drivers, and associated control circuitry. The AE module 194 is coupled via connections in the printed circuit board to the read/write channel 190 and also to each read head and each write head in the plurality of heads 152.

Figure 3:
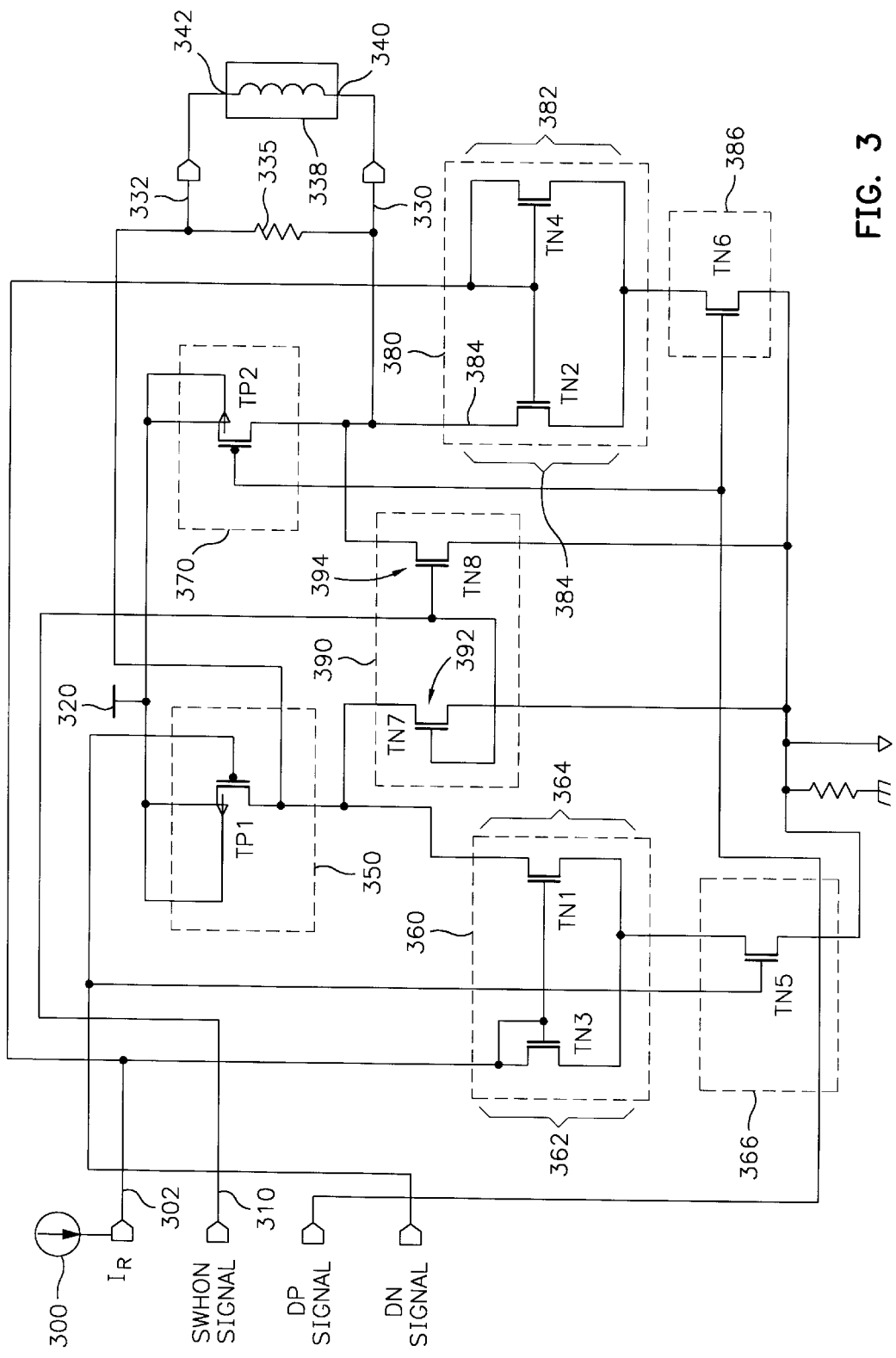
FIG. 3 is a circuit diagram of the write driver in an all-CMOS implementation.
Figure 4:
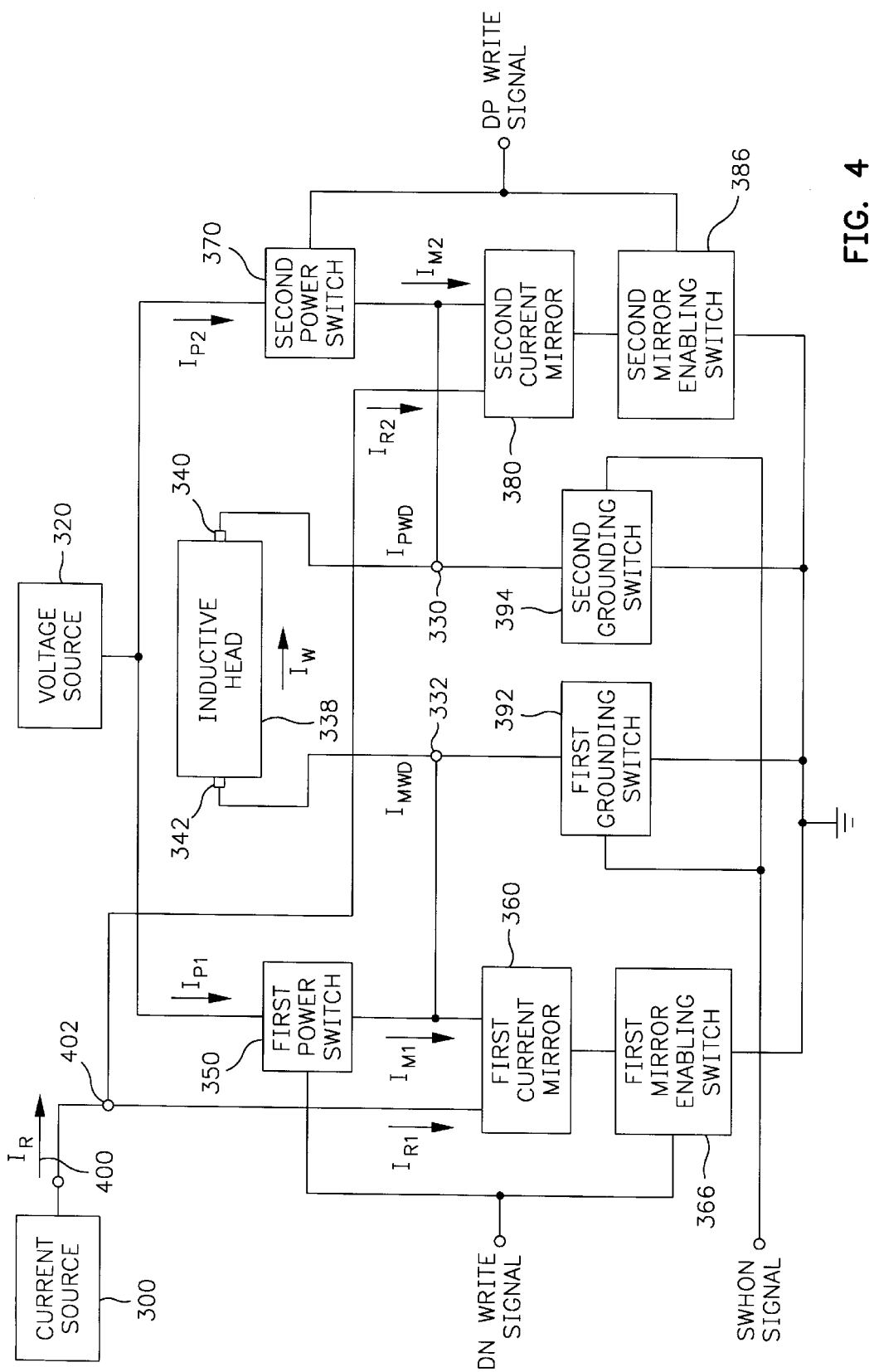
FIG. 4 is a circuit block diagram of the write driver constructed according to the invention, in an all-CMOS implementation.

Reference is now made to FIG. 3 which is a circuit diagram of the all-CMOS implementation of the write driver of the invention. For ease of description of the write driver, boxes have been drawn around groups of elements. A simplified circuit diagram showing only these blocks is shown in FIG. 4, which will be used together with FIG. 5 to describe write operations.

It is highly desirable that the write driver illustrated in FIG. 3 be implemented in the AE module 194 on the actuator arm assembly to minimize the distance between the inductive head and the write circuit and thereby avoid unnecessary loading. The inputs to the write driver are supplied from other circuits (not shown) within the AE module 194. A current source 300 supplies a write current on a line 302 in the amount of $I_R$ which is predetermined by control circuitry located in the AE module 194 or elsewhere.

A write switch-on (SWHON) signal is supplied on a line 310 within the AE module 194 to indicate whether the driver is to be connected to the head or disconnected and the head grounded. When the SWHON signal is low, the write driver to which it is attached is connected to the inductive head. When the SWHON signal is high, the outputs of the write driver are coupled to ground to prevent current from flowing therethrough, thereby preventing data degradation.

A pair of differential signals, including a first (dp) signal and a second (dn) signal, are provided from conventional circuitry elsewhere in the AE module 194. The dp signal and the dn signal are complementary, which means that one is high when the other is low. Also, a conventional voltage source 320 supplies a voltage $V_{DD}$ to the AE unit and the write driver implemented therein.

The outputs of the amplifier circuit include a plus write driver (PWD) output and a minus write driver (MWD) output. The PWD output is coupled to a PWD node 330 and the MWD output is coupled to an MWD node 332. A damping resistor 335, having a value R3 is connected across the MWD node 332 and the PWD node 330. An inductive head, illustrated at 338, which is implemented in each one of the heads 152 shown in FIG. 1 and FIG. 2, includes a first (+w) terminal 340 and a second (−w) terminal 342 that provide a current path through the inductive head. The +w terminal 340 is coupled to the PWD node 330 and the −w terminal 342 is coupled to the MWD node 332.

The write driver comprises a first power switch 350 coupled to the voltage source 320 and the MWD node 332. The dn write signal is coupled to control the first power switch. In the preferred embodiment, the first power switch 350 includes a p-channel MOSFET TP1 whose source is coupled to the voltage source 320 and whose drain, which provides the output, is coupled to the MWD node 332. The gate of the MOSFET TP1 is coupled to the dn signal. For the expected current flow, the MOSFET TP1 is designed to operate in the triode region (i.e., the linear region between the threshold voltage and saturation), one advantage being that voltage overshoot is prevented during operation. Furthermore, the MOSFET TP1 has a high aspect ratio in order to provide a low voltage drop when ON. For example, in one embodiment an aspect ratio of 8000:1 provides an acceptable balance between area (i.e. cost) and voltage drop. In other embodiments the circuit performance can be enhanced by decreasing the voltage drop across the inductive head by using even larger geometry CMOS. For optimum performance, the voltage should be as low as possible, for example, practical voltage values are in the range of 0.2 volts to 0.05 volts (and even lower using enhanced CMOS technology).

A first current mirror 360 includes a first, reference arm 362 electrically coupled to receive the reference current $I_R$ from the current source 300, and a second, mirror arm 364 coupled to the MWD node 332. Preferably, the first, reference arm 362 includes an n-channel MOSFET TN3 whose drain and gate are coupled to the current source 300 and whose source provides an output. Preferably, the second, mirror arm includes an n-channel MOSFET TN1 whose drain is coupled to the MWD node 332, and whose gate is coupled to the gate of the other MOSFET TN3 in the first current mirror, and whose source provides an output. The outputs (sources) of the first, reference arm 362 and the second, mirror arm 364 are coupled together, and supply their output to a first enabling switch 366. Preferably, the MOSFETs TN3 and TN1 are designed to have a voltage drop $V_{DS}$ within the range of 0.6 to 0.4 volts during a transition. However, this value may vary substantially during operation.

The first enabling switch 366 is coupled to switch the output of the first current mirror to ground, responsive to the dn write signal. Preferably, the first enabling switch 366 includes an n-channel MOSFET TN5 whose drain is coupled the output of the first current mirror and whose source is coupled to ground. The gate of the MOSFET TN5 is coupled to the dn signal. When the dn signal is high, the MOSFET TN5 switches on, allowing current to flow through the first current mirror. Otherwise, the MOSFET TN5 prevents current flow therethrough. The dn write signal controls the first enabling switch 366, which is coupled between the first current mirror 360 and ground. Preferably, the MOSFET TN5 has a high aspect ratio, such as 4000:1, to provide a voltage drop $V_{DS}$ within the range of 0.2 to 0.05 volts (preferably 0.15 volts) when operating.

A second power switch 370 is coupled to the voltage source 320 to the PWD node 330 responsive to the dp write signal. Preferably, the second power switch 370 includes a p-channel MOSFET TP2 whose source is coupled to the voltage source 320, whose gate is coupled to the dp signal, and whose source is coupled to the PWD node 330. For the expected current flow, the MOSFET TP2 is designed to operate in the triode region (i.e., the linear region between the threshold voltage and saturation), one advantage being that voltage overshoot is prevented during operation. Furthermore, the MOSFET TP2 has a high aspect ratio in order to provide a low voltage drop when ON. For example, in one embodiment an aspect ratio of 8000:1 provides an acceptable balance between area (i.e. cost) and voltage drop.

In other embodiments the circuit performance can be enhanced by decreasing the voltage drop across the inductive head by using even larger geometry CMOS. For optimum performance, the voltage should be as low as possible. Using conventional CMOS, for example, practical voltage values may be in the range of 0.2 volts to 0.05 volts. Furthermore, by using newly developed enhanced CMOS technology, the voltage drop could approach 0.0 volts.

A second current mirror 380 is also coupled to the PWD node 330. The second current mirror 380 includes a first, reference arm 382 and a second, mirror arm 384. The first, reference arm 382 is coupled to receive the reference current from the current source 300, and the second, mirror arm 384 is coupled to the first arm in such a way that it draws a mirrored current responsive to the reference current. Preferably, the first, reference arm 382 of the second current mirror includes an n-channel MOSFET TN4 whose gate and drain are coupled to the current source 300, and whose source provides an output. Preferably, the second, mirror arm 384 of the second current mirror includes an n-channel MOSFET TN2 whose gate and drain are coupled to the current source 300, and also to the gate of the MOSFET TN4 in the first reference arm 382. The source of the MOSFET TN2 is coupled to the PWD node 330 and its output is coupled to the output of the first, reference arm 382. Preferably, the MOSFETs TN2 and TN4 are designed to have a voltage drop $V_{DS}$ within the range of 0.6 to 0.4 volts during a transition. However, this value may vary substantially during operation.

A second enabling switch 386 is coupled to receive the output of the first current mirror 384. The second enabling switch 386 is also coupled to receive the dp write signal and to switch the output on or off dependent thereon. Preferably, the second enabling switch includes an n-channel MOSFET TN6 whose drain is coupled to the output of the second current mirror, whose gate is coupled to the dp signal, and whose drain is coupled to ground. Preferably, the MOSFET TN6 has a high aspect ratio, such as 4000:1, to provide a voltage drop $V_{DS}$ within the range of 0.2 to 0.05 volts (preferably 0.15 volts) when operating.

A grounding circuit 390 is coupled between ground and the MWD node 332 and the PWD node 330 in order to ground the inductive head 338 and the MWD and PWD nodes responsive to the SWHON signal. The grounding circuit 390 has a first grounding switch 392 and a second grounding switch 394. The first grounding switch 392 is coupled to the MWD node 332, and also to ground. Control is provided by the SWHON signal to ground the MWD node 332. Preferably, the first switch 392 includes an n-channel MOSFET TN7 whose drain is coupled to the MWD node 332, whose source is coupled to ground, and whose gate is coupled to the SWHON signal. Preferably, the second grounding switch 394 includes an n-channel MOSFET TN8 whose source is coupled to the PWD node 330 and whose drain is coupled to ground. The gate of the MOSFET TN8 is coupled to the SWHON signal. As a result, when the SWHON signal is high, the MWD node 332 and the PWD node 330 are grounded, thereby grounding both the +w and −w terminals of the inductive head.

Reference is now made to FIG. 4, which is a simplified circuit diagram of the write driver shown in FIG. 3. FIG. 4 will be utilized to illustrate the method of operation of the write driver circuit. It will be first assumed that the SWHON signal is selected so that the first and second grounding switches are disabled, thereby isolating the inductive head 338 from ground and allowing the write driver to function properly.

Figure 5:
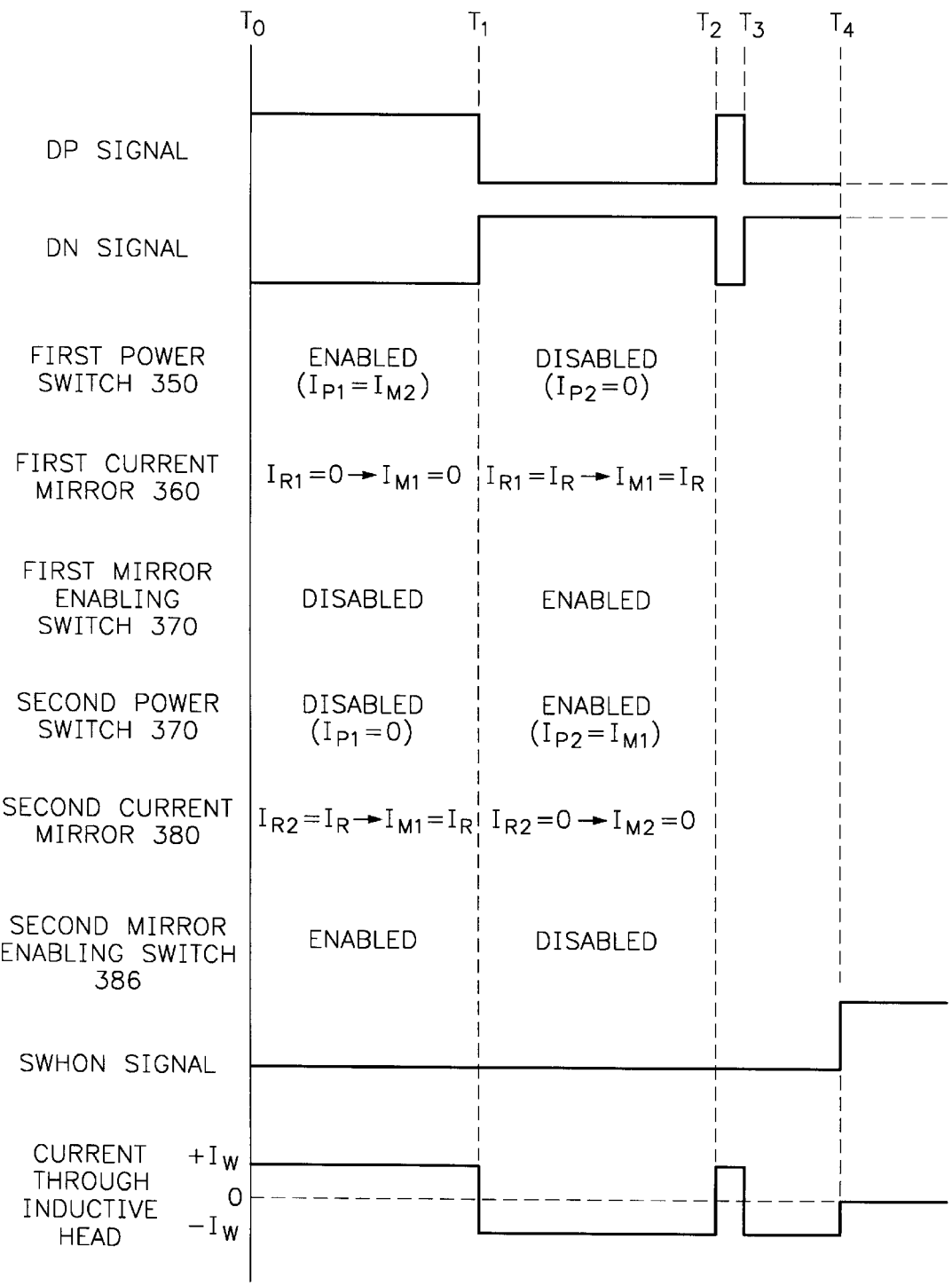
FIG. 5 is a timing diagram showing an illustrative dp signal and dn signal, illustrating the response of the circuit shown in FIGS. 3 and 4.

The current source 300 supplies the reference current $I_R$ in a direction illustrated by an arrow 400 to a node 402, from which it can branch in one of two directions, dependent upon the logic levels of the dp write signal and the dn write signal. Because the dn write signals and the dp write signals are differential signals, only one can be high at a particular time. FIG. 5 is a timing diagram that shows an illustrative dp signal and a dn signal. At the time $T_0$, the dp signal has a logical high value and the dp signal has a logical low. At the time $T_1$, the situation reverses and the dp signal is low and the dn signal is high. The situation reverses again at time $T_2$, at time $T_3$, and again at time $T_4$. It may noted that, in the modulation scheme illustrated that the time between $T_0$ and $T_1$ is different from the time between $T_1$ and $T_2$. This is a result of the particular type of modulation chosen in this design, in which the information content is stored in the time between transitions.

Between time $T_0$ and $T_1$, the dn write signal is low and therefore the p-channel first power switch 350 is enabled and the n-channel first mirror enabling switch 366 is disabled. As a result of the dp signal going high, the p-channel second power switch 370 is disabled and the n-channel second mirror enabling switch 386 is enabled. As a result, the first current mirror 360 is disabled so that no current is drawn through the mirror arm and $I_{m1}=0$. Similarly, because the second power switch is disabled, no current is drawn therethrough and $I_{P2}=0$. However, the second current mirror, as a result of being enabled, draws the reference current $I_R$ through the reference arm, thereby causing an equivalent current to flow through the mirror arm, and as a result $I_{m2}=I_R$. This current is drawn through the inductive head 338 from the first power switch 350 and therefore $I_{m2}=+I_H$. In other words, the current path that operates between time $T_0$ and $T_1$ begins at the voltage source 320, continues through the first power switch 350, through the inductive head 338, through the second current mirror 380, and then through the second mirror enabling switch 386 to ground. The total voltage drop along this current path, in the preferred embodiment, is as follows: a 0.15 voltage drop across the first power switch 350 ($V_{TP1}$), a voltage $V_4$ across the inductive head 338, a 0.5 voltage drop ($V_{TN2}$) across the second current mirror 380, and a 0.15 voltage drop ($V_{TN6}$) across the second mirror enabling switch 386. Therefore, Total $V_{DS}=V_{TP1}+V_{TN2}+V_{TN6}=0.15+0.5+0.15=0.8$ If the voltage supply supplies the standard 5.0 volts, then the voltage available for writing is $V_W=5.0-0.8=4.2$ Of course, the device characteristics can be varied to provide different voltages, depending upon particular design needs, and the voltage supply can also be varied. For example, for low power consumption the voltage supply may be reduced and/or the design of the MOSFETs may have a very high aspect ratio to reduce their voltage when ON, while still providing a high data transfer rate. For example, the circuit design can be enhanced (made faster) by decreasing the voltage drop across the device with larger geometry CMOS techniques, thereby supplying a larger voltage swing across the inductive head.

In the next time interval from $T_1$ to $T_2$, the situation reverses. Particularly, the first power switch 350 is disabled so that $I_{P1}=0$, the first mirror enabling switch 366 is enabled so that $I_{R1}=I_R$, the second power switch 370 is enabled, and the second mirror enabling switch 386 is disabled so that $I_{R2}=I_{M2}=0$. As a result, the reference current $I^R$ is drawn through the first current mirror 360 instead of the second current mirror, thereby causing an equivalent, mirrored current ($I_R=I_{R1}=I_{M1}$) to be drawn through the mirror arm in the first current mirror. As a result, current is drawn through the inductive head 338 from the second power switch 370 but in the opposite direction than during time $T_0$ to $T_1$. In other words, in the time $T_1$ to $T_2$, current is drawn in a second current path from the voltage source 320, through the second power switch 370, through the inductive head 338, through the first current mirror 336, and then to ground through the first mirror enabling switch 370. The voltage drop in the second current path is equivalent to that in the first current path, due to the direct correspondence between the elements. Therefore, for example, in the preferred embodiment the available voltage for writing is 4.2 volts.

Throughout the time period from $T_0$ to $T_2$, the SWHON signal was low, which isolated the MWD node 332 and PWD node 330 from ground. At time $T_4$, illustrated in FIG. 5, the SWHON signal goes high, thereby enabling the first grounding switch 392 and the second grounding switch 394 so that, respectively the MWD node 332 and the PWD node 330 are coupled to ground. As a result, no current can flow through the inductive head 338.

Figure 6:
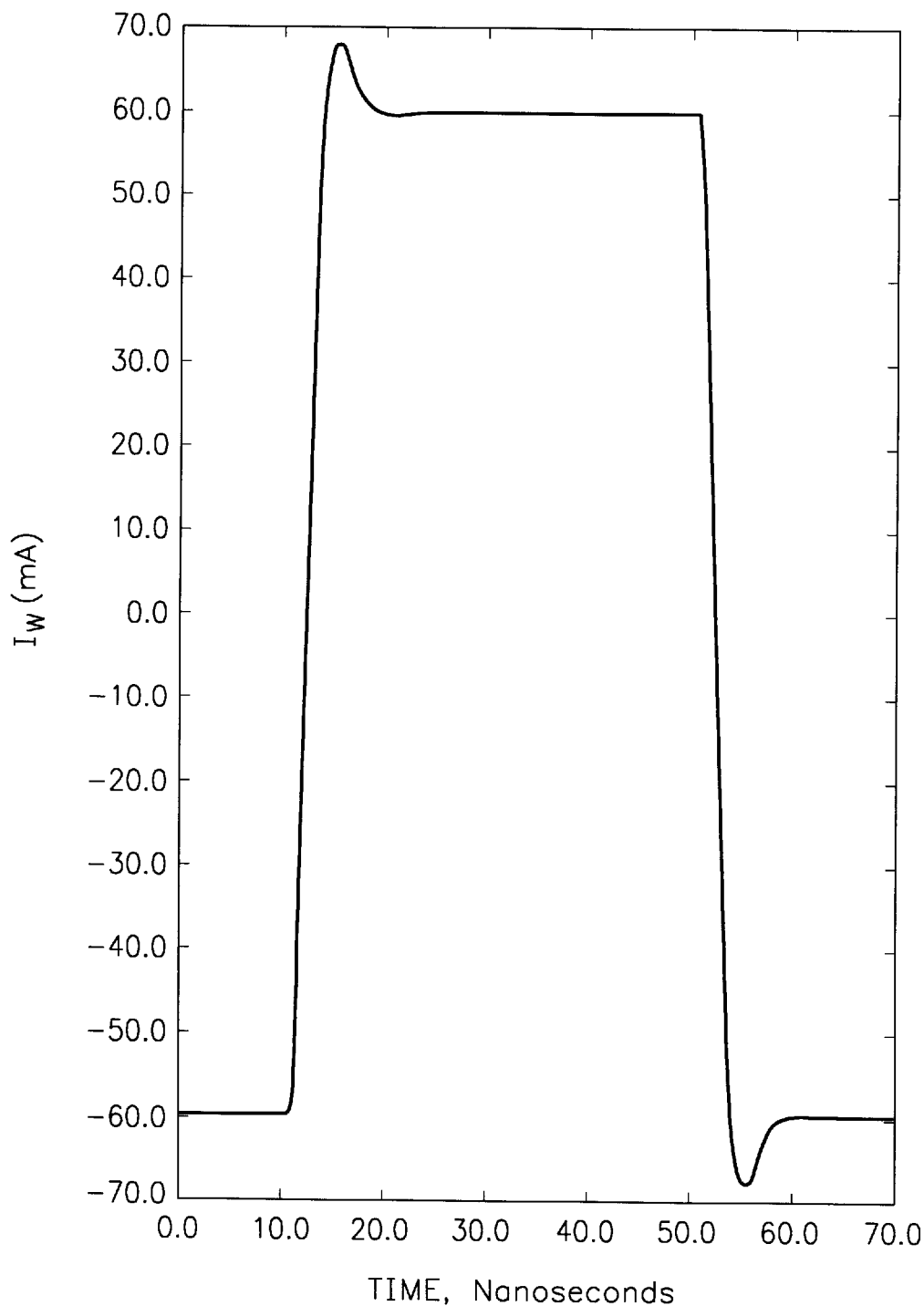
FIG. 6 is a graphical depiction of an actual write driver current $I_W$ for one implemented embodiment of the present invention, with time in nanoseconds on the horizontal axis and current in milliamps on the vertical axis.

FIG. 6 is a graphical depiction of the actual write driver current $I_W$ in one implementation of the present invention. The horizontal axis depicts a scale in nanoseconds (ns) and the vertical axis depicts a scale in milliamps (mA). As illustrated, the current $I_W$ through the inductive head swings from a +60 milliamp peak down to a −60 milliamp trough. The center reference is, of course, zero milliamps and the total current swing is 120 milliamps. The approximate time from trough to peak is about five nanoseconds. Furthermore, it can be seen that the current $I_W$ does not substantially overshoot, and that the peaks and the troughs are approximately smooth with very little "ringing" or apparent jitter.

Figure 7:
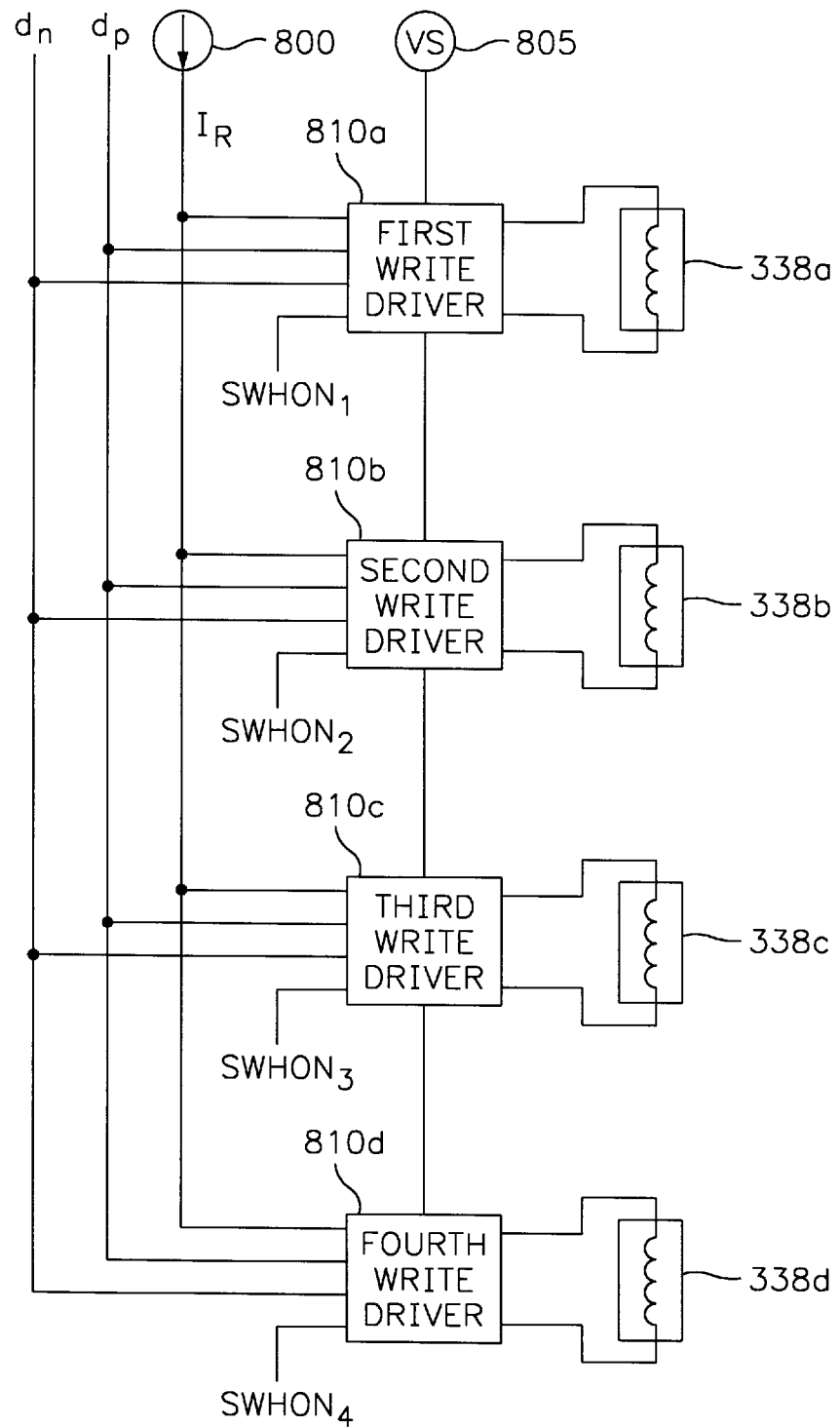
FIG. 7 is is block diagram of an embodiment in which a plurality of write drivers are implemented to drive multiple heads.

FIG. 7 is a block circuit diagram of an embodiment in which a plurality of write drivers 810 are implemented to drive multiple heads. As will be discussed with reference to FIG. 8, the write drivers 810 for this multiple-head implementation are somewhat different from the write driver for a single head. Advantageously, with this multiple-head implementation, a single current source and a single pair of differential write signals can be utilized. Particularly, a voltage source 800 supplies a predetermined current reference $I_R$, and the voltage source 805 supplies a predetermined reference voltage. The current source 800 and the voltage source 805 are each coupled to a first write driver 810a, a second write driver 810b, a third write driver 810c, and a fourth write driver 810d. The differential logic signals dn and dp are also supplied to each of the write drivers 810a–810d. The first write driver 810a is coupled to a first inductive head 338a, the second write driver 810b is coupled to the second inductive head 338b, the third write driver 810c is coupled to a third inductive head 338c, and a fourth write driver 810d is coupled to a fourth inductive head 338d. As illustrated in FIG. 1, each of the inductive heads 338a–338d are positioned closely to one side of a plurality of magnetic recording disks in order to write data thereon.

A plurality of $SWHON_n$ signals are provided within the AE unit, responsive to signals from the master controller, to select only one of the write drivers 810a–810d. Particularly, a first SWHON signal ($SWHON_1$) is supplied to the first write driver, an $SWHON_2$ signal is provided to the second write driver, an $SWHON_3$ signal is provided to the third write driver, and an $SWHON_4$ signal is provided to the fourth write driver.

Figure 8:
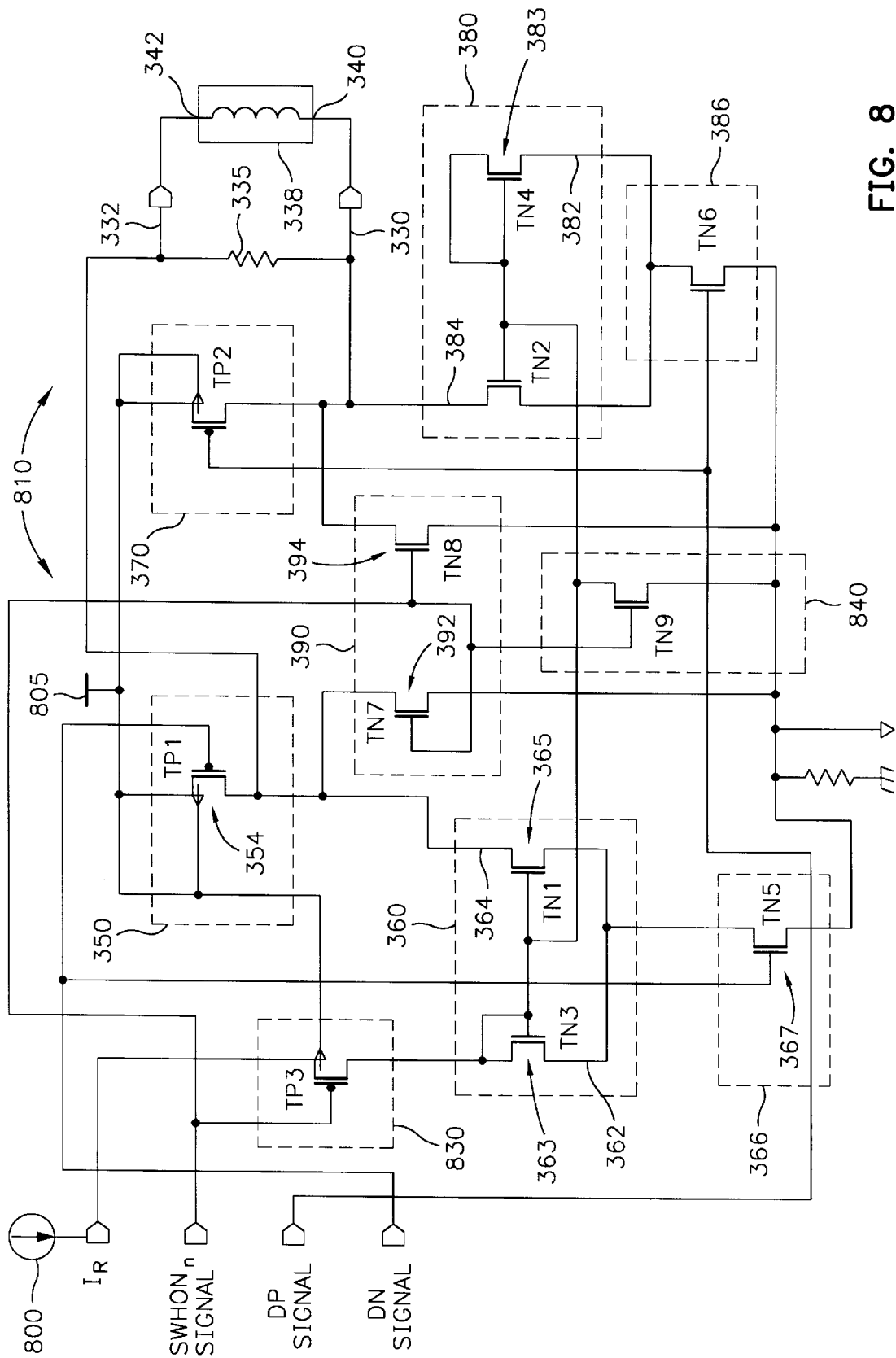
FIG. 8 is a circuit diagram of the write driver for a multiple-head implementation of FIG. 7.

FIG. 8 is a circuit diagram of a write driver 810a for a multiple write driver implementation. This circuit configuration is repeated for the second, third, and fourth write drivers 810b, 810c, and 810d. Many of the circuits are identical with those described previously with reference to FIGS. 3 and 4. For example, the first and second power switches 350, 370, the first and second current mirrors 360, 380, the first and second mirror enabling switches 366, 386, and the grounding circuit 390 are similar. Furthermore, the damping resistor 332, which is coupled across the MWD node 332 and the PWD node 330 is similar.

However, the write circuit 810a, when compared to the previously discussed write circuit, includes additional switches, including a current source switch 830 coupled to switch the current source to the reference arm of the first and second current mirrors 360 and 380, responsive to the $SWHON_1$ signal (as discussed earlier, a separate SWHON signal is provided to each write driver 810a–810d). Preferably, the current source switch 830 comprises a p-channel MOSFET TP3 whose source is coupled to the current source 800 and whose drain is coupled to the reference arm of the first and second current mirrors. Thus, responsive to the $SWHON_1$ signal, the current source is selectively switched on or off to power the write driver 810a.

Furthermore, a current mirror grounding switch 840 is coupled between ground and the coupled gates of the first and second current mirrors, which is also coupled to the output of the current source switch 830. The mirror grounding switch 840 is controlled responsive to the $SWHON_1$ signal. Preferably, the mirror grounding switch 840 comprises an n-channel MOSFET TN9 whose drain is coupled to the coupled gates, both current mirrors 360 and 380, and whose source is coupled to ground. The gate of the MOSFET TN9 is coupled to the $SWHON_1$ signal.

In an alternative embodiment based on the embodiment of FIGS. 7 and 8, a separate current source is provided to each of the multiple write drivers in order to supply the current necessary to operate multiple write drivers in parallel. Each of these plurality of current sources provides sufficient current to operate the write driver to which it is connected. Each write driver is supplied a separate control signal ($SWHON_n$) that enables operation, and only a single complementary pair of inputs (the dp and dn signals), connected in parallel to all the write drivers, is needed. In operation, the control unit enables each of the write drivers with the SWHON signal, enables each current source (if appropriate), and begins writing data using the dp and dn signals. This alternative embodiment is useful in manufacturing, for example, to write multiple duplicate signal patterns such as a prewritten sector servo pattern that formats the disk.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawings.

We claim:

1. A high speed write driver for an inductive head in a magnetic recording unit, comprising:

a voltage source;

a first and a second field effect transistor (FET) power switch coupled between the voltage source and the inductive head, each having an ON state and an OFF state;

a current source;

a first and a second mirror enabling FET switch, each having an ON state and an OFF state;

a first and a second current mirror, each having a reference arm coupled between the current source and the first and second mirror enabling switch, and a mirror arm coupled between the inductive head and the first and second mirror enabling switch, each comprising an FET; and differential signal means for selecting said ON and OFF states to provide one of a first current path through the first power switch, the inductive head in a first direction, the second current mirror and the second current mirror enabling switch, and a second current path through the second power switch, the inductive head in a second direction, the first current mirror, and the first mirror enabling switch.

2. The write driver of claim 1 wherein the first and second FET power switches each comprise a p-channel FET.

3. The write driver of claim 1 wherein the first and the second FET power switches have a high aspect ratio to provide a voltage drop within the range of 0.2 to 0.05 volts.

4. The write driver of claim 1 wherein the first and second mirror enabling FET switches each comprise an n-channel FET.

5. The write driver of claim 1 wherein the first and second mirror enabling FET switches each have a high aspect ratio to provide a voltage drop within the range of 0.2 to 0.05 volts.

6. The write driver of claim 1 wherein the first and second current mirrors each comprise an n-channel FET.

7. The write driver of claim 1 wherein the first and second FET power switches comprise a p-channel FET, the first and second current mirrors each comprise an n-channel FET, and the first and second mirror enabling switches each comprise an n-channel FET.

8. The write driver of claim 7 wherein the the first and second power switches, the first and second current mirrors, and the first and second mirror enabling switches are implemented in a complementary metal oxide semiconductor (CMOS) device technology.

9. The write driver of claim 1 wherein the first and second FET power switches each comprise a p-channel FET having an aspect ratio to provide a voltage drop within the range of 0.2 to 0.05 volts in the ON state, the first and second current mirrors each comprise an n-channel FET, and the first and second mirror enabling switches each comprise an n-channel FET having an aspect ratio to provide a voltage drop of 0.2 to 0.05 volts in the ON state.

10. The write driver of claim 1 further comprising a first and a second grounding switch coupled between the inductive head and ground, said first and second grounding switch have an ON state in which the write driver circuit is unselected by coupling the inductive head to ground.

11. A write driver for an inductive head having a first (+w) terminal and a second (−w) terminal in a disk drive unit having an electronics module that provides a current source supplying a reference current, a voltage source, a pair of differential logic signals including a first (dp) write signal and a second (dn) write signal each having a HIGH state and a LOW state, and a write switch-on (SWHON) signal, said write driver comprising:

a first field effect transistor (FET) power switch coupled to switch the voltage source to the −w terminal responsive to the LOW state of said dn write signal;

a first current mirror having a reference arm including an FET coupled to the current source and a mirror arm including an FET coupled to the −w terminal;

a first enabling FET switch, responsive to the HIGH state of said dn write signal, coupled between said first current mirror and ground;

a second FET power switch coupled to switch the voltage source to the +w terminal responsive to the LOW state of said dp signal;

a second current mirror having a reference arm including an FET coupled to the current source and a mirror arm including an FET coupled to the +w terminal; and a second enabling FET switch, responsive to the HIGH state of said dp write signal, coupled between said second current mirror and ground.

12. The write driver of claim 11 wherein the first and second FET power switches each comprise a p-channel metal oxide semiconductor field effect transistor (MOSFET).

13. The write driver of claim 12 wherein each p-channel MOSFET has an aspect ratio to provide a voltage drop within the range of 0.2 volts to 0.05 volts in the ON state.

14. The write driver of claim 12 wherein the FETs in the first and second current mirrors comprise an n-channel MOSFET, and the first and second enabling FET switches each comprise an n-channel MOSFET.

15. The write driver of claim 14 wherein the n-channel MOSFETs in the first and second enabling FET switches have an aspect ratio to provide a voltage drop in the range of 0.2 to 0.05 volts in the ON state.

16. The write driver of claim 14 further comprising a grounding circuit including a first n-channel MOSFET coupled between said −w terminal and ground, and a second n-channel MOSFET coupled between said +w terminal and ground, that, responsive to a HIGH state of the SWHON signal, connects the inductive head to ground.

17. The write driver of claim 11 further comprising a grounding circuit means for grounding said inductive head responsive to a HIGH state of the SWHON signal.

18. The write driver of claim 17 wherein the grounding circuit means includes a first n-channel MOSFET coupled between said −w terminal and ground, and a second n-channel MOSFET coupled between said +w terminal and ground, that, responsive to a HIGH state of the SWHON signal, connects the inductive head to ground.

19. The write driver of claim 18 wherein said grounding circuit means includes a third n-channel MOSFET coupled between said first and second current mirrors and ground, for grounding said current mirrors responsive to a HIGH state of the SWHON signal to prevent leakage current at the inductive head.

20. A complementary metal oxide semiconductor (CMOS) write driver for an inductive head having a first (+w) terminal and a second (−w) terminal in a disk drive unit that provides a current source supplying a reference current, a voltage source supplying a voltage $V_{DD}$, a pair of differential logic signals including a first (dp) write signal and a complementary (dn) write signal each having a HIGH and a LOW state, and a write switch-on (SWHON) signal, said write driver comprising a first power switch including a p-channel metal oxide semiconductor field effect transistor (MOSFET) coupled to switch the voltage source to ground responsive to a LOW value of the dn signal;

a second power switch including a p-channel MOSFET coupled to switch the voltage source to ground responsive to a LOW value of the dp signal;

a first enabling switch including an n-channel MOSFET coupled to turn on the first current mirror responsive to a HIGH value of the dn signal;

a first current mirror including a reference arm that comprises an n-channel MOSFET coupled to draw the reference current therethrough and a mirror arm that comprises an n-channel MOSFET coupled to the −w terminal and to the reference arm to mirror the current drawn therethrough;

a second enabling switch comprising an n-channel MOSFET coupled to turn on the second current mirror responsive to a HIGH value of the dp signal; and a second current mirror including a reference arm comprising an n-channel MOSFET coupled to draw the reference current therethrough and a mirror arm comprising an n-channel MOSFET coupled to the +w terminal and to the reference arm to mirror the current drawn therethrough.

21. The write driver of claim 20 wherein each p-channel MOSFET in the ON state has an aspect ratio to provide a voltage drop within the range of 0.2 volts to 0.1 volts.

22. The write driver of claim 20 wherein the n-channel MOSFETs in the first and second enabling switches have an aspect ratio that provides a voltage drop in the range of 0.2 to 0.05 volts in the ON state.

23. The write driver of claim 20 further comprising a grounding circuit means for grounding said inductive head responsive to a HIGH state of the SWHON signal.

24. The write driver of claim 23 wherein the grounding circuit means includes a first n-channel MOSFET coupled between said −w terminal and ground, and a second n-channel MOSFET coupled between said +w terminal and ground, that, responsive to a HIGH state of the SWHON signal, connect the inductive head to ground.

25. The write driver of claim 24 wherein said grounding circuit means includes a third n-channel MOSFET coupled between said first and second current mirrors and ground, for grounding said current mirrors responsive to a HIGH state of the SWHON signal to prevent leakage current at the inductive head.

26. A method of writing a magnetic signal in a magnetic recording disk with an inductive write head having a first (+w) terminal coupled to a first current mirror and a first field effect transistor (FET) power switch and a second (−w) terminal coupled to a second current mirror and a second FET power switch, comprising the steps of:

supplying a predetermined reference current to an FET in a reference arm of a first current mirror and an FET in a reference arm of a second current mirror;

enabling said first current mirror and disabling said second current mirror so that said reference current is drawn through said first current mirror;

enabling said second FET power switch and disabling said first FET power switch; and drawing a mirrored current through an FET in a mirror arm of the first current mirror, the second FET power switch, and the inductive write head.

27. The writing method of claim 26 wherein said first and second FET power switches comprise p-channel metal oxide semiconductor filed effect transistor (MOSFETs), said step of disabling said first FET power switch comprises applying a HIGH signal, and said step of enabling said second FET power switch comprises applying a LOW signal and operating said second FET power switch in the triode region.

28. The writing method of claim 26 further comprising the step of coupling the +w and −w terminals of the inductive head to ground when the write driver is disabled.

29. The writing method of claim 28 further comprising the step of coupling the first and second current mirrors to ground when the write driver is disabled.

30. Write circuitry for driving a plurality of inductive heads in a multiple disk drive unit with a single current source and a single pair of differential write signals including a first (dp) signal and a second (dn) signal each having a HIGH state and a LOW state, said write circuitry comprising:

a voltage source;

a current source;

a first write driver electrically coupled to a first write head;

a second write driver electrically coupled to a second write head;

signal means for selecting one of said first and second write drivers including a first write switch on (SWHON) signal supplied to said first write driver and a second SWHON signal supplied to said second write driver; and each of said first and second write drivers comprising a first and a second field effect transistor (FET) power switch coupled between the voltage source and the inductive head, each having an ON state and an OFF state;

a first and a second mirror enabling FET switch, each having an ON state and an OFF state, a first and a second current mirror, each having a reference arm including a first FET coupled between the current source and the first and second mirror enabling switch, and a mirror arm including a second FET coupled between the inductive head and the first and second mirror enabling switch, the gates of said first and second FETs being coupled together and to said current source, means, responsive to said dp and dn signals, for providing one of a first current path through the first power switch, the inductive head in a first direction, the second current mirror and the second current mirror enabling switch, and a second current path through the second power switch, the inductive head in a second direction, the first current mirror, and the first mirror enabling switch, and a current source switch, responsive the respective SWHON signal, coupled between the current source and the reference arms of the first and second current mirrors.

31. The write circuitry of claim 30 wherein each write driver further comprises a mirror grounding switch, responsive to the respective SWHON signal, coupled between ground and the coupled gates of the first and second current mirrors.

32. The write driver of claim 30 wherein the first and second FET power switches each comprise a p-channel FET.

33. The write driver of claim 30 wherein the first and second mirror enabling FET switches each comprise an n-channel FET.

34. The write driver of claim 30 wherein the first and second current mirrors each comprise an n-channel FET.

35. The write driver of claim 30 wherein the first and second FET power switches comprise a p-channel FET, the first and second current mirrors each comprise an n-channel FET, and the first and second mirror enabling switches each comprise an n-channel FET.

36. The write driver of claim 35 wherein the the first and second power switches, the first and second current mirrors, and the first and second mirror enabling switches are implemented in an entirely complementary metal oxide semiconductor (CMOS) device technology.

37. A disk drive unit comprising:

a spindle;

a plurality of stacked magnetic disks coupled to the spindle;

a control unit;

a spindle drive controller coupled to the control unit and the spindle;

an actuator assembly comprising
- a comb unit having a plurality of actuator arms, and
- a plurality of head suspension assemblies each coupled to one of said plurality of actuator arms, each head suspension assembly comprising an inductive head electrically coupled to the control unit;

an arm electronics unit electrically coupled to each inductive head and the control unit, and mechanically connected to the actuator assembly comprising a first field effect transistor (FET) write driver and a second FET write driver;

an actuator positioning means, coupled to the control unit, for positioning the inductive heads at a position selected by the control unit.

38. The disk drive unit of claim 37 wherein each of said first and second write drivers comprises:

a first and a second FET power switch coupled between the voltage source and the inductive head, each having an ON state and an OFF state;

a first and a second mirror enabling FET switch, each having an ON state and an OFF state, a first and a second current mirror, each having a reference arm including a first FET coupled between the current source and the first and second mirror enabling switch, and a mirror arm including a second FET coupled between the inductive head and the first and second mirror enabling switch, the gates of said first and second FETs being coupled together and to said current source, means, responsive to said dp and dn signals, for providing one of a first current path through the first power switch, the inductive head in a first direction, the second current mirror and the second current mirror enabling switch, and a second current path through the second power switch, the inductive head in a second direction, the first current mirror, and the first mirror enabling switch, and a current source switch, responsive the respective SWHON signal, coupled between the current source and the reference arms of the first and second current mirrors.

* * * * *

UNITED STATES PATENT AND TRADEMARK OFFICE
CERTIFICATE OF CORRECTION

PATENT NO.   : 5,822,141
DATED        : October 13, 1998
INVENTOR(S)  : Chung et al It is certified that error appears in the above-identified patent and that said Letters Patent is hereby corrected as shown below:

Column 11, line 33, eliminate the second occurrence of "the".

Column 13, line 55, change "filed" to --field--.

Signed and Sealed this

Twenty-third Day of February, 1999

Attest:

Q. TODD DICKINSON

*Attesting Officer*     *Acting Commissioner of Patents and Trademarks*